US 6,748,197 B2

(12) United States Patent
Lindemann et al.

(10) Patent No.: US 6,748,197 B2
(45) Date of Patent: *Jun. 8, 2004

(54) SINGLE ANTENNA FOR RECEIPT OF SIGNALS FROM MULTIPLE COMMUNICATIONS SYSTEMS

(75) Inventors: Brian Lindemann, Olathe, KS (US); Tuan Nguyen, Olathe, KS (US)

(73) Assignee: AlliedSignal Inc., Morristown, NJ (US)

(*) Notice: Subject to any disclaimer, the term of this patent is extended or adjusted under 35 U.S.C. 154(b) by 6 days.

This patent is subject to a terminal disclaimer.

(21) Appl. No.: 10/277,027

(22) Filed: Oct. 20, 2002

(65) Prior Publication Data
US 2003/0045244 A1 Mar. 6, 2003

Related U.S. Application Data

(63) Continuation of application No. 09/444,542, filed on Nov. 22, 1999.
(60) Provisional application No. 60/146,880, filed on Aug. 3, 1999.

(51) Int. Cl.[7] .................................................. H04B 1/46
(52) U.S. Cl. ........................ 455/82; 455/25; 455/13.3; 455/12.1; 455/550.1; 455/289; 455/552.1; 342/352; 342/357.12; 342/357.06
(58) Field of Search .................... 455/82, 25, 13.3, 455/11.1, 12.1, 550.1, 552.1, 280, 289, 550, 552; 343/700 R, 711, 713; 342/350, 352, 357.12, 357.06

(56) References Cited

U.S. PATENT DOCUMENTS

| 3,812,494 | A | * | 5/1974 | Howell et al. ............... 343/852 |
| 4,963,945 | A | * | 10/1990 | Cooper et al. ............... 455/307 |
| 6,151,509 | A | * | 11/2000 | Chorey ......................... 455/550 |
| 6,185,434 | B1 | * | 2/2001 | Hagstrom et al. ........... 455/552 |
| 6,195,563 | B1 | * | 2/2001 | Samuels ....................... 455/553 |
| 6,249,670 | B1 | * | 6/2001 | Kunkel et al. ................. 455/83 |
| 6,292,138 | B1 | * | 9/2001 | Choi ............................ 342/458 |
| 6,400,706 | B1 | * | 6/2002 | Cousineau .................... 370/350 |

* cited by examiner

Primary Examiner—Vivian Chin
Assistant Examiner—Marceau Milord

(57) ABSTRACT

A method and device for using a single antenna for simultaneously receiving radio frequency signals in different L-band and GPS data band radio frequency bands embodied by example in a circuit having a directional coupler configured to direct a signal input at a first port into two second ports. Filters are coupled to receive the output of each second port, the filters being configured to reflect radio frequency energy in radio frequency bands other than the GPS data radio frequency band. The directional coupler is further configured to direct the reflected radio frequency energy into another port of the directional coupler. A filter is coupled to the other port of the directional coupler and is configured to reflect radio frequency energy in radio frequency bands other than the L-band radio frequency.

30 Claims, 1 Drawing Sheet

SINGLE ANTENNA FOR RECEIPT OF SIGNALS FROM MULTIPLE COMMUNICATIONS SYSTEMS

This is a continuation of application Ser. No. 09/444,542, filed Nov. 22, 1999.

This application claims the benefit of U.S. Provisional Application Serial No. 60/146,880, filed in the names of Brian Lindemann and Tuan Nguyen on Aug. 3, 1999, the complete disclosure of which is incorporated herein by reference.

FIELD OF THE INVENTION

This invention relates to radio antenna systems and methods, particularly antenna systems and methods for enabling one antenna to transmit a first frequency radio signal and simultaneously receive a second radio signal of a frequency near the first radio signal frequency.

BACKGROUND OF THE INVENTION

Both radio navigation and radio communications equipment are often employed in the operation of vehicles, such as boats, automobiles, and airplanes. One common type of radio navigation is Global Positioning System navigation, commonly known as GPS navigation, which works by computing the vehicle's position based on radio signals encoded with ephemeris data received from multiple satellites. Satellite telecommunications systems provide worldwide wireless two-way telephonic communications.

Given the current low cost of both GPS navigation and satellite telecommunications systems, many marine, automotive, and airborne vehicles carry both systems on-board. Often, the vehicle passengers and crew find simultaneous operation of both systems desirable.

GPS navigation data signals are currently broadcast at a carrier frequency of 1.575 gigahertz (GHz). Two-way satellite telecommunications systems operate in the L-band frequency range. The system operating frequency is system dependent, with each manufacturer's equipment operating in a frequency range assigned by license. For example, one commercial system operates in the frequency band of 1.616 GHz and 1.625 GHz. Although satellite telecommunications systems transmit and receive at frequencies nearly the same as the GPS operating frequency, the satellite telecommunications broadcasts and transmissions must not interfere with GPS navigation, at least as regards aircraft operating under FAA regulations.

Normally, each system operates a dedicated antenna. Traditionally, the requirement of noninterference is satisfied, first by filtering the satellite telecommunications system transmitter to limit radio frequency (RF) energy in the GPS operating band, and second by attenuating the RF energy produced by the satellite telecommunications system in the GPS operating band by physically separating the GPS and satellite telecommunications system antennas on the host aircraft. Each of these responses is unsatisfactory. The traditional filter capable of satisfying the requirement is large and heavy, both undesirable traits in aircraft equipment. Antenna space on most aircraft is minimal, further limitations on the antenna system, such as a minimum distance between antennas, exacerbates the problem. Antenna space is similarly limited in some marine and automotive applications. Thus, notwithstanding the above considerations in response to the noninterference requirement, employing a single antenna is desirable to both receive GPS navigation signals and to both receive and transmit satellite telecommunications system signals.

Furthermore, a desire toward economy of cost recommends that a single antenna perform for multiple radio systems. Moreover, a desirable antenna is relatively light weight and low profile to minimize drag and maximize cosmetic appearances.

Additionally, a single antenna both transmitting and receiving communication signals in a first radio frequency band and simultaneously receiving a second radio signal having a frequency near the first radio frequency band is desirably versatile enough to be used with a variety of electronic equipment.

U.S. Pat. No. 5,170,493 discloses a single antenna used to both receive relatively low frequency LORAN-C radio signals broadcast at a carrier frequency of 100 kilohertz (kHz) and to transmit or receive relatively high frequency VHF radio signals broadcast at carrier frequencies in the range of 30 megahertz (MHz) up to 300 MHz. U.S. Pat. No. 5,170,493 also describes a number of other systems for employing the same antenna to both receive relatively low frequency radio signals and to transmit or receive relatively high frequency radio signals by reference to Tanner, et al. U.S. Pat. No. 4,268,805; Elliott, U.S. Pat. No. 4,095,229; and Tyrey, U.S. Pat. No. 4,037,177 Powell, et al. U.S. Pat. No. 3,812,494 discloses a system for receiving and transmitting Doppler frequencies and telemetering frequencies simultaneously over the same antenna, as distinguished from GPS and satellite telecommunications system frequencies, and employs an impedance matching network in close proximity with the antenna itself. Duncan, Jr., et al. U.S. Pat. No. 3,217,273 discloses a system for coupling several transmitters and receivers to a single antenna, while avoiding the radiation of spurious signals resulting from intermodulation, and avoiding swamping the receivers. In addition, U.S. Pat. No. 3,739,390 discloses a system using two antennas operating within different frequency ranges but sharing a single coaxial line, the central conductor forming the receiving element of one antenna and the shield forming the receiving element of the other antenna, duplexing circuitry connected to the antenna separates the signals received at the two antennas and applies the separated signals to the appropriate receiver or transmitter. U.S. Pat. No. 5,574,978 discloses an interference cancellation system allowing different transmitting and receiving radios to utilize a single antenna.

Although a number of systems have been developed for employing one antenna to both receive relatively low frequency radio signals and to transmit or receive relatively high frequency radio signals, such systems solve only the problem as relates to signals orders of magnitude different in frequency. Each of the disclosed systems fails to either consider or resolve the problem of using one antenna to both transmit and receive signals in a first radio frequency band and simultaneously receive a second radio signal having a frequency very near the first radio frequency band as presented, for example, by the problem of combining the function of receiving GPS navigation signals in a single antenna with the function of transmitting and receiving satellite telecommunications system signals where the frequencies are separated by approximately 41 MHz or only 3%. Furthermore, the systems disclosed in the prior would not allow sharing of a single antenna with radio systems operating in the frequency ranges used by GPS and satellite telecommunications systems. Nor would the prior art systems allow sharing of a single antenna with two radio systems operating with such a relatively small frequency spread.

SUMMARY OF THE INVENTION

This invention provides a method of utilizing a single antenna for both a satellite telecommunications system transceiver and a GPS receiver, the total implementation of which provides less RF loss in the satellite telecommunications system path, and a smaller filter package than traditional implementations.

The present invention overcomes the limitations of the prior art by providing a method and circuit for using one antenna to both transmit and receive signals in a first radio frequency band and simultaneously receive a second radio signal having a frequency very near the first radio frequency band.

According to one aspect of the invention, the circuit receives a radio frequency (RF) signal in a first radio frequency band introduced into the first port of a directional coupler. The directional coupler divides the energy in the received signal into two signals and introduces each of the divided signals into second and third ports of the directional coupler. Band pass filters coupled to each of the second and third ports of the directional coupler reflect any energy in the divided signals which is in frequency bands other than a second different radio frequency band. The directional coupler combines the energy in the reflected signals into a first RF output signal. The received RF signal is either a broadcast signal received at an antenna coupled to the first port of the directional coupler or a transmission signal generated by a transmitter that is coupled to the first port of the directional coupler. According to one embodiment of the invention, the RF energy reflected by the band pass filters coupled to each of the second and third ports of the directional coupler is energy in the L-Band frequency range, the operation band of typical two-way satellite telecommunications systems. For example, RF energy reflected by the band pass filters coupled to each of the second and third ports of the directional coupler is energy in the frequency band of 1.616 GHz and 1.625 GHz, i.e., the operation band of one known two-way satellite telecommunications system. According to another aspect of the invention, a conventional two-way satellite telecommunications systems transceiver is coupled to the directional coupler to generate and receive signals in the L-Band frequency range, for example, in the frequency band of 1.616 GHz and 1.625 GHz. According to yet another aspect of the invention, a band pass filter is coupled between the output of the directional coupler and the transmitter to clean the generated signal of harmonics in the second frequency range and other spurious emissions.

According to another aspect of the invention, the band pass filters coupled to each of the second and third ports of the directional coupler pass any energy in the divided signals which is in the second different radio frequency band. A second coupler coupled to the above band pass filters combines the passed RF energy into a second RF output signal in the second radio frequency band. According to one embodiment of the invention, the RF energy passed by the band pass filters is in the 1.575 gigahertz (GHz) frequency band. According to one embodiment of the invention, the RF energy passed by the band pass filters in the 1.575 gigahertz (GHz) frequency band is received and processed by a conventional Global Positioning System receiver. According to various other aspects of the invention, a low noise amplifier amplifies and a series of one or more band pass filters coupled between the output of the second coupler and the receiver respectively amplify and clean the received signal.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

The Figure is an illustrative block diagram describing the isolation circuit of the present invention, including a radio transceiver that transmits and receives signals in a first radio frequency band simultaneously with a radio receiver receiving a second radio signal having a frequency very near the first radio frequency band using a single antenna.

DETAILED DESCRIPTION OF PREFERRED EMBODIMENT

Figure 1:
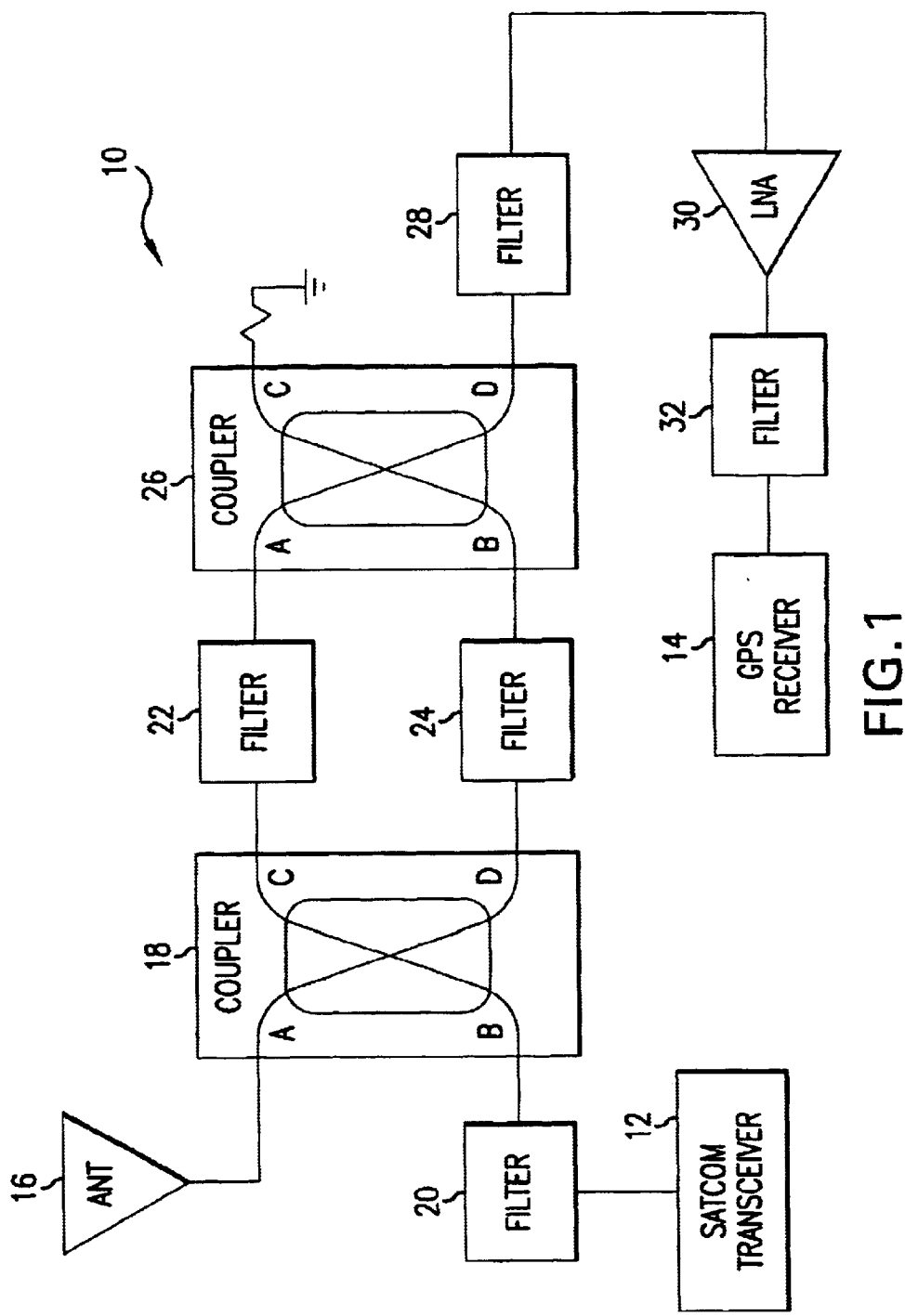

The present invention is a unique isolation circuit that allows a first radio system transmitting and receiving signals in a first radio frequency band to simultaneously share a single antenna with a second radio system receiving a second radio signal having a frequency very near the first radio frequency band. An illustrative embodiment of the isolation circuit of the invention is described herein in terms of an isolation circuit allowing a GPS radio navigation signal receiver, commonly known as a GPS receiver, to simultaneously share a single antenna with a satellite telecommunications system, also known as a SatCom system. The embodiment illustrated is not intended to in any way limit the scope of the invention. Those of ordinary skill in the art will recognize that isolation circuit of the invention may be practiced with other radio systems than those described in the illustration.

Global positioning system radio navigation, commonly known as GPS navigation, is well known in the art, as evidenced by several issued U.S. patents and commercial products embodying the inventions disclosed in such patents. Examples are disclosed in U.S. Pat. Nos. 5,222,245 and 5,546,092, the disclosures of which are incorporated herein by reference. GPS navigation data signals are currently broadcast at a carrier frequency of 1.575 gigahertz (GHz) and received on a dedicated antenna coupled to the GPS receiver. Global satellite telecommunications systems, commonly known as SatCom systems, are also well known in the art, as similarly evidenced by several issued U.S. patents and commercial products embodying the inventions disclosed in such patents. One exemplary SatCom system is disclosed in U.S. Pat. No. 5,918,155, the disclosure of which is incorporated herein by reference. The AIRSAT™ 1 multichannel SatCom systems of the IRIDIUM® World Air Service and manufactured by AlliedSignal Incorporated are two commercial examples. Conventional two-way SatCom systems, such as the AIRSAT™ 1 multichannel SatCom systems, are known to transmit and receive in the L-Band frequency range assigned by license, specifically in the frequency band of 1.616 GHz and 1.625 GHz. GPS and SatCom systems each operate over an independent dedicated antenna. When present on a single vehicle, the independent GPS and SatCom antennas are isolated from one another, primarily to preclude interference of the GPS signals by the SatCom transmissions.

In general, the invention makes use of conventional frequency matched twin-line couplers, small filters and a low noise amplifier to duplex a radio frequency transceiver, such as a SatCom system transceiver, and a radio system receiving radio signals broadcast at a frequency very near the transceiver radio frequency band, such as a GPS receiver, simultaneously on single antenna. Losses occur in any practical implementation of the invention. While the description below omits reference to such losses for clarity of explanation, those of ordinary skill in the art will recognize and account for such losses in a practical implementation of the invention.

The Figure is an illustrative block diagram describing the isolation circuit 10 of the present invention. A radio transceiver 12 transmits and receives signals in a first radio frequency band simultaneously with a radio receiver 14 receiving a second radio signal having a frequency very near the first radio frequency band using a single antenna 16. Radio transceiver 12 is, for example, a conventional two-way SatCom system transmitting and receiving in the L-Band frequency range, for example, in the frequency band of 1.616 GHz and 1.625 GHz. Radio receiver 14 is, for example, a conventional GPS receiver receiving GPS navigation data signals broadcast at a nearby carrier frequency of 1.575 gigahertz (GHz). Thus, the operating frequencies of transceiver 12 and receiver 14 are only separated by approximately 41 MHz or only 3%. Shared antenna 16 has a band width broad enough to simultaneously receive both the GPS navigation signals broadcast at 1.575 GHz and SatCom signals broadcast at 1.616 GHz, and to radiate the 1.625 GHz signal transmitted by two-way SatCom transceiver 12.

Antenna 16 is coupled to a four-way directional coupler 18 formed using conventional wire-line couplers tuned to the desired frequencies. RF energy received at antenna 16 is introduced at port A of coupler 18 and coupled into ports C and D. The coupling between ports A and C results in a loss of 3 dB with a 0 degree phase shift. The coupling between ports A and D results in a loss of 3 dB with a −90 degree phase shift. Similar couplings exist from B to D and C, from C to A and B, and from D to B and A. Port B is similarly coupled into ports D and C, with the coupling between B and D resulting in a loss of 3 dB with a 0 degree phase shift, and the coupling between ports B and C resulting in a loss of 3 dB with a −90 degree phase shift. Port C is similarly coupled into ports A and B, with the coupling between C and A resulting in a loss of 3 dB with a 0 degree phase shift, and the coupling between ports C and B resulting in a loss of 3 dB with a −90 degree phase shift. Port D is similarly coupled into ports B and A, with the coupling between D and B resulting in a loss of 3 dB with a 0 degree phase shift, and the coupling between ports D and A resulting in a loss of 3 dB with a −90 degree phase shift.

A band pass filter 20 protects the portion of the circuit operating in the first frequency band, for example, the SatCom system frequency band, from RF energy in the second frequency band, for example, the GPS frequency band, as well as other signal noise. Band pass filter 20 is coupled between port B of coupler 18 and transceiver 12. Band pass filter 20 is designed to pass RF energy which is within the first frequency band, for example, the SatCom system frequency band, and reflect energy which is outside that band.

A pair of band pass filters 22, 24 protect the portion of the circuit operating in the second frequency band, for example, the GPS frequency band, from RF energy in the first frequency band, for example, the SatCom system frequency band, as well as other signal noise. Band pass filters 22, 24 are each designed to pass RF energy which is within the second, or GPS, frequency band, while reflecting RF energy which is outside the second band. Filters 22, 24 couple respective ports C and D of coupler 18 to ports A and B of another four-way directional coupler 26 having essentially the same characteristics as coupler 18. Filter 22 couples port C of first four-way directional coupler 18 to port A of coupler 26, and filter 24 couples port D of first coupler 18 to port B of second coupler 26. RF energy introduced at respective ports A and B of coupler 26 is recombined at port D of coupler 26. Port D of second coupler 26 is coupled into receiver 14 through a band pass filter 28, a low noise amplifier 30, and another band pass filter 32. Both band pass filters 28 and 32 are designed to reflect RF energy which is outside the second, or GPS, frequency band, and pass RF energy which is within the second band. Port C of second coupler 26 is grounded, preferably using a 50 ohm resistor.

The diplexing/protection provided by isolation circuit 10 of the present invention is effected as shown in the Figure. During transmission, an RF signal introduced from transceiver 12, such as a SatCom transceiver, is passed through band-pass filter 20, which cleans the transmission signal in the first frequency band of harmonics in the second, or GPS, frequency band and spurious emissions. The cleaned RF signal is introduced into coupler 18 at port B. Coupler 18 splits the RF energy equally into two signals coupled into ports C and D. At ports C and D of coupler 18, the two cleaned RF signals are coupled into respective band pass filters 22 and 24. The frequency of the RF energy in the two cleaned RF signals is outside the pass range of both filters 22 and 24, so each filter 22 and 24 reflects the same received RF energy back into coupler 18. The coupling and phasing on the reflected RF energy is as described above, such that all of the RF energy in the cleaned RF signal is passed to port A of coupler 18 and output to antenna 16; none of the RF energy is reflected back to port B and the signal generator, i.e., transceiver 12, and none of the RF energy is passed through filters 22 or 24 to the portion of the circuit operating in the second frequency band, for example, a GPS portion of the circuit.

An RF signal in the first frequency band, for example, the SatCom frequency band, received at antenna 16 follows a similar path to transceiver 12. An RF signal in the first frequency band received on antenna 16 is passed into coupler 18 at port A, and is coupled through ports C and D into respective band pass filters 22 and 24, as described above. The RF energy in the received first frequency band signal, or the SatCom frequency band signal, is outside the pass band of both filters 22 and 24, therefore, filters 22 and 24 reflect the energy back into coupler 18. As described above, the coupling and phasing on the reflected RF energy introduced back into coupler 18 at respective ports C and D passes all of the RF energy through band pass filter 20 to port B of coupler 18 and output, for example, to receiver 12 for processing. None of the RF energy is passed through filters 22 or 24 to the portion of the circuit operating in the second frequency band, for example, a GPS portion of the circuit, and none of the received RF energy is reflected back to port A and antenna 16.

An RF signal in the second frequency band, for example, the GPS frequency band, received at antenna 16 is passed into first coupler 18 at port A, and is coupled through ports C and D of coupler 18 into respective band pass filters 22 and 24, as described above. The RF energy of the received second frequency band signal, or GPS signal, is within the pass band of filters 22 and 24 and is passed through to respective ports A and B of second coupler 26. Second coupler 26 recombines the RF energy introduced at respective ports A and B at port D, where the RF energy is passed into another band pass filter 28. The RF energy is within the pass band of filter 28 and is passed to low noise amplifier 30 for amplification. The amplified RF energy is passed by band pass filter 32, which is again designed to pass RF energy which is within the second, or GPS, frequency band, as is band pass filter 28, as described above. The resulting second frequency band signal, or GPS signal, is passed through filter 32 and output, for example, to receiver 14 for processing.

While the preferred embodiment of the invention has been illustrated and described, it will be appreciated that various changes can be made therein without departing from the spirit and scope of the invention. For example, while the invention is illustrated using a frequency matched twin-line for coupling the RF energy, low-cost three-pole ceramic filters with a pass band centered at 1.575 GHz to filter the RF energy, and a conventional GPS low noise amplifier with the entire system laid out on a single RF substrate to provide impedance matching of the lines between components, the invention is not intended to be limited to the disclosed embodiments. In one example, a conventional 3 dB branch-line coupler is tuned to the desired frequency has similar characteristics to four-way directional coupler 18 described above, except that it operates in a narrower frequency band and is preferred for a narrow band application. Various other alternative embodiments will be obvious to those of ordinary skill in the art and such alternative embodiments are intended to be within the scope of the present invention.

The embodiments of the invention in which an exclusive property of privilege is claimed are defined as follows:

1. A method for using a single antenna for simultaneously receiving radio frequency signals in a first L-band radio frequency and Global Positioning System (GPS) data signals in a second radio frequency band very near the first L-band radio frequency, the method comprising:

coupling a shared antenna to a four-way directional coupler;

tuning the coupler to L-band and GPS data band radio frequencies;

feeding a received radio frequency into the coupler and dividing and phase shifting the energy in the received radio frequency signal into a first L-band radio frequency signal and a second GPS data band radio frequency signal;

feeding the first L-band radio frequency signal into a first band pass filter and reflecting back into said coupler the energy in said two received radio frequency signals in frequency bands other than the first L-band radio frequency;

using a bandpass filter, feeding the second GPS data band radio frequency signal into a second band pass filter and reflecting back into said coupler the energy in said two received radio frequency signals in frequency bands other that the second GPS data radio frequency band; and combining said energy in said two reflected signals into a first radio frequency output signal.

2. The method recited in claim 1, wherein said received signal is a radio frequency signal in the first L-band radio frequency; and further comprising cleaning said received signal before said dividing the energy into two received signals.

3. The method recited in claim 2, further comprising outputting said first L-band radio frequency output signal to an antenna.

4. The method recited in claim 3, wherein said first received L-band radio frequency signal is a satellite communications system signal.

5. The method recited in claim 4, further comprising, generating said satellite communications system signal.

6. The method recited in claim 1, wherein said received signal is a radio frequency signal in the second GPS data radio frequency band; and further comprising combining the energy in said two received signals in the second GPS data radio frequency band into a second GPS data radio frequency output signal.

7. The method recited in claim 6, further comprising amplifying the combined energy.

8. A frequency isolation circuit for simultaneously receiving radio frequency signals in different first and second radio frequency bands, the first and second radio frequency band being L-band and the second radio frequency band being GPS navigation data radio frequency band, the circuit comprising:

a directional coupler configured to direct a signal input at first port into one or more second ports; and one or more filters coupled to receive the output of each said second ports, said one or more filters being configured to reflect radio frequency energy in radio frequency bands other than the second GPS navigation data radio frequency band;

said directional coupler further configured to direct said reflected radio frequency energy into another port of said directional coupler; and a filter coupled to said other port of said directional coupler, said filter configured to reflect radio frequency energy in radio frequency bands other than the first radio frequency L-band.

9. The frequency isolation circuit recited in claim 8, wherein said second and third ports are each coupled to a said fourth port of said directional coupler.

10. The frequency isolation circuit recited in claim 9, wherein:

said coupling between said first port and said second port results in a loss of 3 dB with a 0 degree phase shift;

said coupling between first port and said third port results in a loss of 3 dB with a −90 degree phase shift;

said coupling between said fourth port and said second port resulting in a loss of 3 dB with a −90 degree phase shift;

said coupling between said fourth port and said third port resulting in a loss of 3 dB with a 0 degree phase shift;

said coupling between said second port and said first port resulting in a loss of 3 dB with a 0 degree phase shift;

said coupling between said second port and said fourth port resulting in a loss of 3 dB with a −90 degree phase shift;

said coupling between said third port and said fourth port resulting in a loss of 3 dB with a 0 degree phase shift; and said coupling between said third port and said first port resulting in a loss of 3 dB with a −90 degree phase shift.

11. The frequency isolation circuit recited in claim 10, further comprising a third band pass filter coupled to said fourth port of said directional coupler, said third band pass filter passing radio frequency energy in the first satellite telecommunications radio frequency band.

12. The frequency isolation circuit recited in claim 11, further comprising a transmitter generating a radio frequency signal in the first satellite telecommunications radio frequency band.

13. The frequency isolation circuit recited in claim 12, wherein said transmitter is a transceiver generating a radio frequency signal in the first satellite telecommunications radio frequency band and receiving said output signal at said fourth port of said directional coupler.

14. The frequency isolation circuit recited in claim 10, further comprising a second coupler having an output port and input ports coupled to respective ones of said first and second band pass filters, said second coupler being structured for combining said radio frequency energy in the second GPS radio frequency band passed by said first and second pass filters into an output signal at said output port.

15. The frequency isolation circuit recited in claim 14, further comprising an amplifier coupled to said output port of said second coupler.

16. The frequency isolation circuit recited in claim 15, further comprising a single radio frequency substrate having said directional coupler, said first, second and third filters, and said amplifier laid thereon.

17. The frequency isolation circuit recited in claim 15, wherein said amplifier is a low noise amplifier.

18. The frequency isolation circuit recited in claim 14, further comprising a radio frequency receiver coupled to said output port of said second coupler for receiving said output signal.

19. The frequency isolation circuit recited in claim 18, wherein said radio frequency receiver coupled to said output port of said second coupler for receiving said output signal is a Global Positioning System receiver.

20. The frequency isolation circuit recited in claim 19, wherein said second and third ports are each coupled to said fourth port of said directional coupler.

21. The frequency isolation circuit recited in claim 20, wherein:
said coupling between said first port and said second port results in a loss of 3 dB with a 0 degree phase shift;
said coupling between said first port and said third port results in a loss of 3 dB with a −90 degree phase shift;
said coupling between said fourth port and said second port resulting in a loss of 3 dB with a −90 degree phase shift;
said coupling between fourth port and said third port resulting in a loss of 3 dB with a 0 degree phase shift;
said coupling between said second port and said first port resulting in a loss of 3 dB with a 0 degree phase shift;
said coupling between said second port and said fourth port resulting in a loss of 3 dB with a −90 degree phase shift;
said coupling between said third port and said fourth port resulting in a loss of 3 dB with a 0 degree phase shift; and
said coupling between said third port and said first port resulting in a loss of 3 dB with a −90 degree phase shift.

22. The frequency isolation circuit recited in claim 21, further comprising a third band pass filter coupled to said fourth port of said directional coupler, said third band pass filter passing radio frequency energy in the first satellite telecommunications radio frequency band.

23. The frequency isolation circuit recited in claim 22, further comprising a transmitter generating a radio frequency signal in the first satellite telecommunications radio frequency band.

24. The frequency isolation circuit recited in claim 23, wherein said transmitter is a transceiver generating a radio frequency signal in the first satellite telecommunications radio frequency band and receiving said output signal at said fourth port of said directional coupler.

25. The frequency isolation circuit recited in claim 21, further comprising a second coupler having an output port and input ports coupled to respective ones of said first and second band pass filters, said second coupler being structured for combining said radio frequency energy in the second GPS radio frequency band passed by said first and second band pass filters into an output signal at said output port.

26. The frequency isolation circuit recited in claim 25, further comprising an amplifier coupled to said output port of said second coupler.

27. The frequency isolation circuit recited in claim 26, further comprising a single radio frequency substrate having said directional coupler, said first, second and third filters, and said amplifier laid thereon.

28. The frequency isolation circuit recited in claim 26, wherein said amplifier is a low noise amplifier.

29. The frequency isolation circuit recited in claim 25, further comprising a radio frequency receiver coupled to said output port of said second coupler for receiving said output signal.

30. The frequency isolation circuit recited in claim 29, wherein said radio frequency receiver coupled to said output port of said second coupler for receiving said output signal is a Global Positioning System receiver.

* * * * *